United States Patent
Kurita et al.

(10) Patent No.: US 8,464,688 B2
(45) Date of Patent: Jun. 18, 2013

(54) THROTTLE BODY FOR INTERNAL COMBUSTION ENGINE

(75) Inventors: Kazuhisa Kurita, Chiyoda-ku (JP); Katsunari Takagi, Chiyoda-ku (JP); Teruhiko Moriguchi, Chiyoda-ku (JP); Hiromichi Tsugami, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 82 days.

(21) Appl. No.: 12/424,909

(22) Filed: Apr. 16, 2009

(65) Prior Publication Data

US 2010/0116246 A1    May 13, 2010

(30) Foreign Application Priority Data

Nov. 11, 2008  (JP) ................................ 2008-288791

(51) Int. Cl.
| | |
|---|---|
| *F02D 9/08* | (2006.01) |
| *F02M 3/06* | (2006.01) |
| *F16K 1/22* | (2006.01) |

(52) U.S. Cl.
USPC ...... 123/337; 123/339.13; 123/343; 123/363; 123/376; 251/305

(58) Field of Classification Search
USPC ...... 123/337, 339.13, 343, 363, 376; 251/305
See application file for complete search history.

(56) References Cited

U.S. PATENT DOCUMENTS

| | | | | |
|---|---|---|---|---|
| 3,626,919 | A * | 12/1971 | MacMillan | 123/198 DB |
| 4,084,561 | A * | 4/1978 | Miller | 123/389 |
| 4,569,321 | A * | 2/1986 | Bonfiglioli et al. | 123/339.24 |
| 4,809,659 | A * | 3/1989 | Tamaki et al. | 123/399 |
| 4,860,706 | A * | 8/1989 | Suzuki et al. | 123/337 |
| 6,000,377 | A * | 12/1999 | Sato et al. | 123/337 |
| 6,109,240 | A * | 8/2000 | Sato et al. | 606/130 |
| 6,164,623 | A * | 12/2000 | Ito et al. | 251/305 |
| 6,202,626 | B1 * | 3/2001 | Ito et al. | 123/336 |
| 6,431,142 | B1 * | 8/2002 | Armatis | 123/337 |
| 6,729,298 | B1 * | 5/2004 | Sterr | 123/339.13 |
| 6,986,336 | B2 * | 1/2006 | Tanimura et al. | 123/343 |
| 7,028,666 | B2 * | 4/2006 | Kamimura et al. | 123/399 |
| 7,063,067 | B2 * | 6/2006 | Kado et al. | 123/399 |
| 7,121,259 | B2 * | 10/2006 | Wayama et al. | 123/399 |
| 7,156,074 | B2 * | 1/2007 | Hanasato | 123/399 |
| 7,481,198 | B2 * | 1/2009 | Tweet | 123/337 |

FOREIGN PATENT DOCUMENTS

JP   10-196416 A   7/1998

* cited by examiner

*Primary Examiner* — Stephen K Cronin
*Assistant Examiner* — David Hamaoui
(74) *Attorney, Agent, or Firm* — Sughrue Mion, PLLC

(57) ABSTRACT

An throttle body for rotating a valve shaft of an air-intake throttle valve through a decelerating mechanism by a motor and change the opening area of an air-intake passage by rotating the valve shaft is equipped with a lever portion that is disposed so as to be interlocked with the decelerating mechanism and regulates the opening degree of the air-intake throttle valve under the full-open state, and an adjusting screw that is threadably inserted from the outside of the body portion and abuts against the lever portion in the body portion to change the opening degree of the air-intake throttle valve under the full-open state.

4 Claims, 4 Drawing Sheets

THROTTLE BODY FOR INTERNAL COMBUSTION ENGINE

BACKGROUND OF THE INVENTION

1. Field of the Invention

The present invention relates to a throttle body for executing an opening/closing operation of an air intake valve provided in an air intake passage of an internal combustion engine.

2. Description of the Related Art

There is generally well known a throttle body for controlling the opening degree of an air-intake throttling valve in accordance with the operation of an acceleration pedal (for example, see JP-A-10-196416).

In the throttle body shown in the above publication, a torque generated by a motor is transmitted to a valve shaft by a mechanical reduction gear to rotate a throttle valve fixed to the valve shaft, and an adjusting screw for adjusting a minute full-close air leakage amount under the full-close state of the air-intake passage and also executing a full-close opening degree adjustment of about 5° or less so as to prevent the throttle valve from biting the air-intake passage is fixed to a stopper portion for regulating the opening degree at the full-close side of the throttle valve. Furthermore, the stopper portion for regulating the opening degree under the full opening state constitutes a full-open stopper on the body wall surface while the position at which the opening degree of the throttle valve is set to be substantially parallel to the air-intake passage.

As disclosed in JP-A-10-196416, according to the conventional throttle body, an air-intake passage diameter is set in conformity with the maximum required air amount of the internal combustion engine while the air flow rate (amount) at the position at which the air resistance of the throttle valve is minimum (the state that the air-intake passage and the throttle valve are parallel to each other) is set as the maximum air flow rate. This is because the range of the opening degree from the full-close position of the throttle valve till the full-open position is larger, the control resolution when the throttle valve is driven by the motor is higher. Accordingly, in the conventional throttle body, the diameters of the air-intake passage and the throttle valve are determined according to the maximum required air flow rate of the internal combustion engine.

However, in the conventional setting method described above, it is required to prepare throttle bodies having air-intake passages and throttle valve diameters different every internal combustion engine in accordance with various maximum required air flow rates of internal combustion engines. Therefore, various kinds of bodies must be created, so that it is required to prepare various kinds of expensive metal molds. Furthermore, special designs are required for the air-intake valve, the shaft, etc., tooling change must be executed, and an exclusive line is required every machine type in some cases.

However, with respect to the internal combustion engines, there is a case where the control resolution is permitted to be lowered, and also there is a case where it is required to preferentially solve the problem that the cost is increased because the number of the types of throttle bodies is increased in conformity with the maximum required air amounts of the internal combustion engines.

SUMMARY OF THE INVENTION

The present invention has been implemented in view of the foregoing situation, and has an object to enable a throttle body to be adapted to internal combustion engines having different maximum requirement air flow rates by only simple adjustment of parts.

In order to attain the above object, a throttle body for an internal combustion engine that includes an air-intake throttle valve comprising a body portion having an air-intake passage formed therein, a valve shaft which is supported freely rotatably in the body portion and a throttle valve which is fixed to the valve shaft and varies the opening area of the air-intake passage, the valve shaft of the air-intake throttle valve being rotated through a decelerating mechanism by a motor and the opening area of the air-intake passage being varied by rotating the valve shaft, further comprises: a lever portion which is disposed so as to be interlocked with the decelerating mechanism and regulates the opening degree of the air-intake throttle valve under a full-open state; and an adjusting screw that is threadably inserted from the outside of the body portion and abuts against the lever portion in the body portion to change the opening degree of the air-intake throttle valve under the full-open state.

According to this invention, it is unnecessary to prepare various kinds of throttle bodies in conformity with maximum required air flow rates of internal combustion engines, and there can be obtained an throttle body which can be simply adapted by merely changing the opening degree of the air-intake throttle valve under the full-open state.

Particularly, the full-open stopper is constructed by an adjustable screw as means of changing the opening degree of the air-intake throttle valve under the full open state, so that the opening degree under the full open state can be changed by only adjusting the screw after fabrication. Therefore, this invention is effective to miniaturization and reduction of cost which are a design concept of the internal combustion engine.

Furthermore, the tip of the adjusting screw is made spherical and the contact surface of the lever against which the adjusting screw abuts is designed to have a curved surface. Accordingly, even when the adjusting range of the adjusting screw exceeds 5° for example, the load can be received by substantially the center of the tip of the adjusting screw at all times, and even when the contact surface is worn due to repetitive contact, the load can be stably received by the tip portion of the adjusting screw, which contributes to increase of the lifetime.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
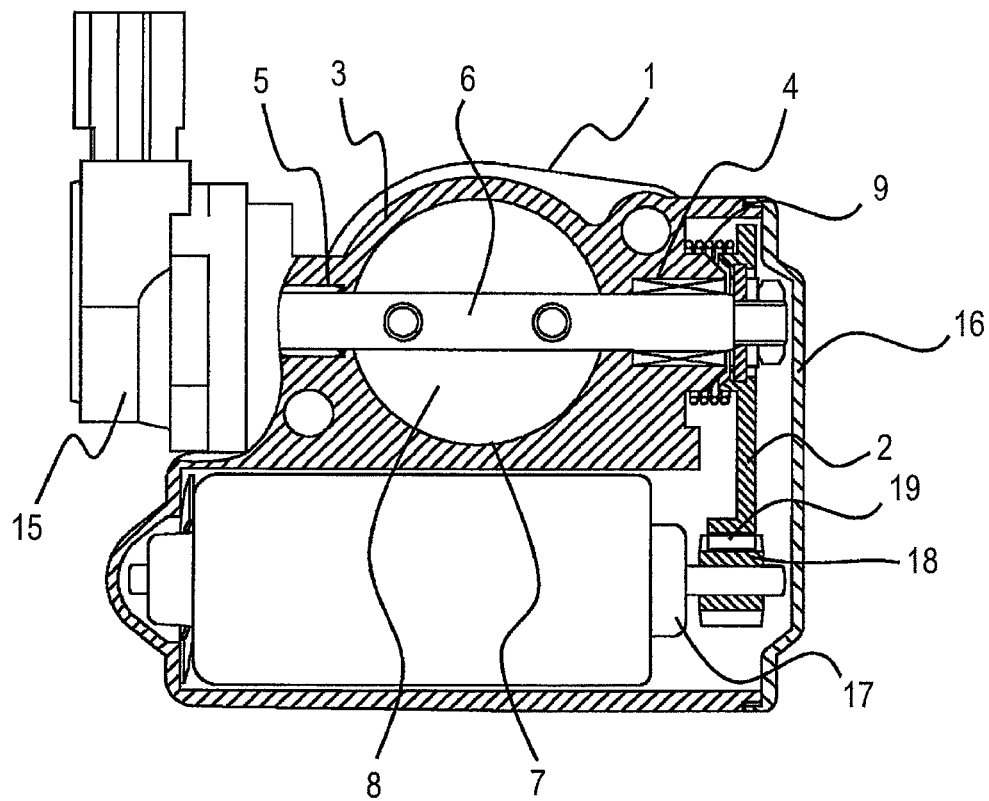
FIG. 1 is a cross-sectional view showing a throttle body according to a first embodiment of the present invention.

Preferred embodiments according to the present invention will be described hereunder with reference to the accompanying drawings.

First Embodiment

A first embodiment of the present invention will be described with reference to FIGS. 1 to 4. In the figures, same reference numerals represent the same or corresponding parts.

Figure 2:
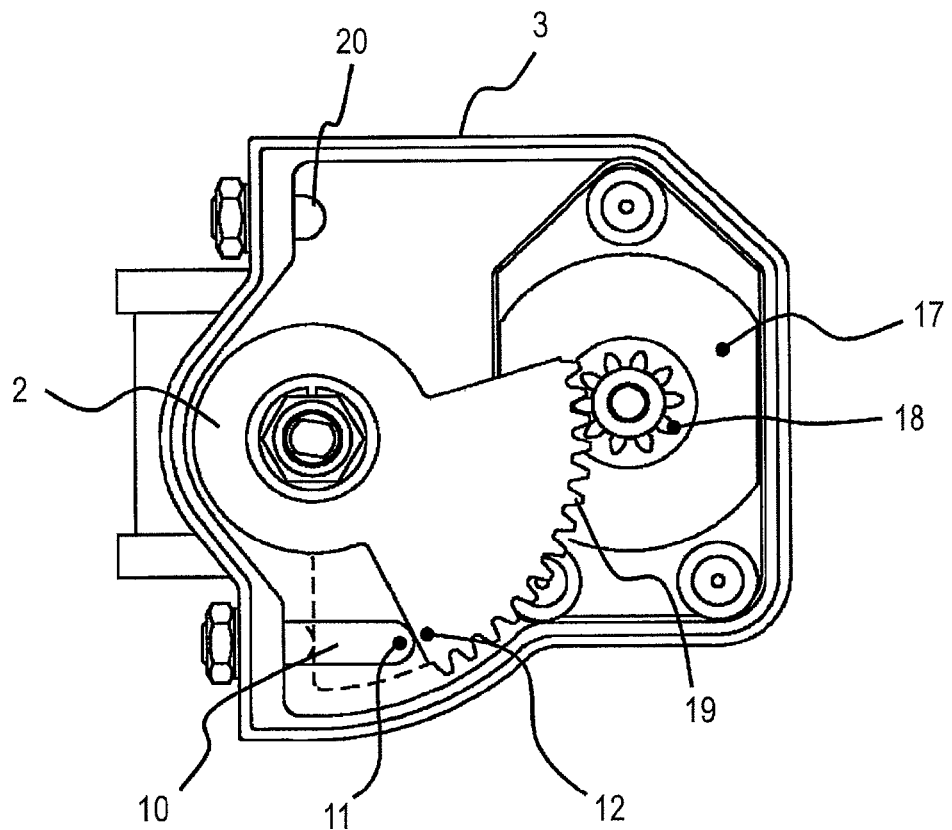
FIG. 2 is a plan view showing a decelerating unit according to the first embodiment of the present invention, and shows the full-open position of a lever.
Figure 3:
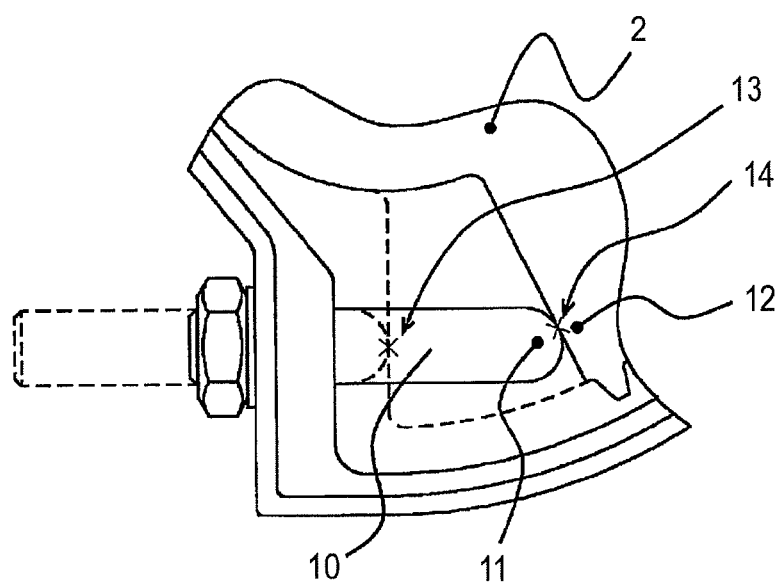
FIG. 3 is an enlarged view showing a full-open stopper unit of the first embodiment according to the present invention.
Figure 4:
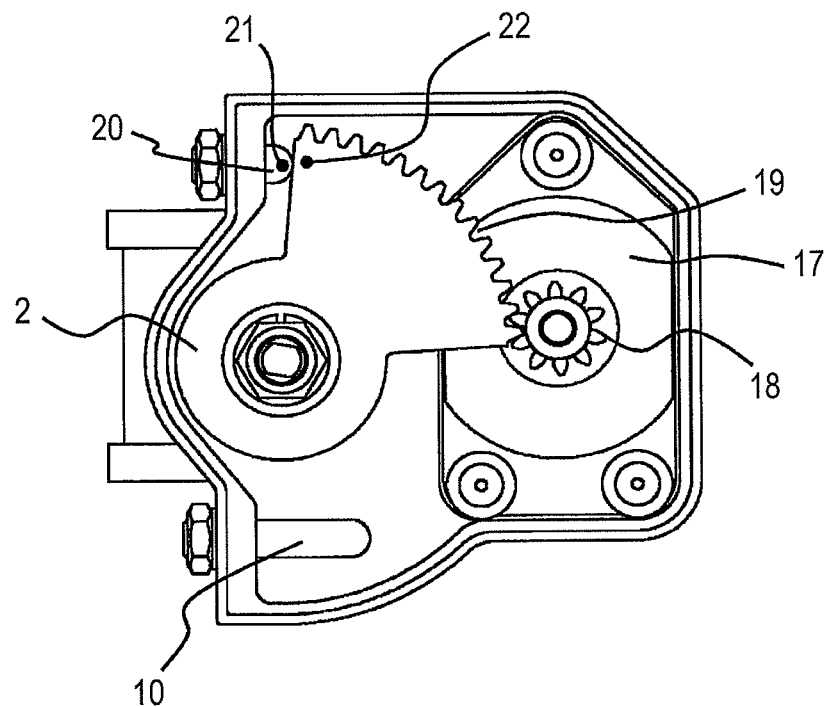
FIG. 4 is a plan view showing the decelerating unit of the first embodiment according to the present invention, and shows the full-close position of the lever.

FIG. 1 is a cross-sectional view showing a throttle body according to the first embodiment of the present invention, and FIG. 2 is a right-side view of a decelerating unit when a right-handed cover 16 of FIG. 1 is detached, and shows a gear mechanism at the full-open position of a lever. FIG. 3 is an enlarged view of a stopper unit, and FIG. 4 is a right-side view of the decelerating unit corresponding to FIG. 2, and shows the full-close position of the lever. In FIGS. 1 to 4, the throttle body mainly comprises an air-intake throttle valve 1, a lever 2 joined to the air-intake throttle valve 1, a motor 17 and a decelerating mechanism.

The air-intake throttle valve 1 has a body 3, a valve shaft 6 which is freely rotatably supported through a first bearing 4 and a second bearing 5 by right and left walls of the body 3, a throttle valve 8 which is fixed to the valve shaft 6 and varies the opening area of an air-intake passage 7 formed in the body 3, and a spring 9 which is provided in the neighborhood of the first bearing 4 and urges the throttle valve 6 so as to close the valve.

The body 3 is formed of aluminum or resin, and it is designed in a substantially cylindrical shape extending in a vertical direction to the drawing surface of FIG. 1. The air-intake passage 7 is formed in the body 3.

As is apparent from FIG. 2, the lever 2 has a partial gear 19, and driving force is transmitted from the motor 17 through a decelerating gear 18 to the lever 2. These elements constitute the decelerating mechanism. The rotation of the lever 2 in the clockwise direction sets the partial gear 19 of the lever 2 to a full-open position as shown in FIG. 2. Conversely, the rotation of the lever 2 in the counterclockwise direction sets the partial gear 19 of the lever 2 to a full-close position as shown in FIG. 4.

A full-open adjusting screw 10 is threadably inserted from the outside of the body 3 into the lower portion of the lever 2 in the body 3 and constitutes a full-open stopper unit, and a full-close adjusting screw 20 is threadably inserted from the outside of the body 3 into the upper portion of the lever 2 in the body 3 and constitutes a full-close stopper unit of the lever 2.

FIG. 3 shows the adjustment state of the full-open adjusting screw 10 at the full-open position of the throttle valve 8. The adjusting state has a full-open stopper position 11 indicated by a solid line and the full-open stopper position 12 of the lever 2 corresponding to the full-open stopper position 11. Reference numeral 14 represents a full-open stopper contact portion under the state that the adjusting screw 10 is fastened most firmly (i.e., the adjusting screw 10 is inserted to the deepest position). The full-open stopper position 11 of the adjusting screw 10 can be adjusted till a second full-open stopper position (indicated by a dashed line of FIG. 3) by rotating the full-open adjusting screw 10 in a loosing (pull-out) direction (i.e., by pulling out the adjusting screw 10 to the shallowest position), thereby adjusting the opening degree of the throttle valve 8 under the full-open state.

Reference numeral 13 represents a full-open stopper contact position under the state that the adjusting screw 10 is loosened at the maximum level (i.e., pulled out to the shallowest position). The lever 2 is also rotated in the clockwise direction to the full-open stopper position indicated by the dashed line in accordance with the pull-out of the adjusting screw 10. Therefore, the full-close opening degree of the throttle valve 8 can be arbitrarily changed in the above range. Accordingly, the maximum value of the air flow rate flowing in the air-intake passage 7 can be arbitrarily changed in conformity with the maximum required air amount of the internal combustion engine.

In the thus-constructed throttle body, air taken through an air filter (not shown) at the air-intake upstream side is introduced into the air intake passage 7 in the body 3, and the air-intake flow rate of the introduced air is adjusted in accordance with the opening degree of the throttle valve 8 which is turned against the elastic force of the spring 9 through the lever 2. The adjusted air is led out into the internal combustion engine disposed air-tightly at the downstream side of the air-intake throttle valve 1, mixed with air supplied from a fuel injection valve (not shown) in a combustion chamber and then ignited.

As described above, according to the throttle body of the first embodiment, the adjustment screw 10 is threadably inserted from the outside of the body 3 into the body 3, whereby the full-open stopper position 11 can be adjusted. Therefore, the full-open opening degree of the throttle valve 8 can be arbitrarily changed, and thus the maximum value of the air flow rate (amount) flowing in the air-intake passage 7 can be arbitrarily changed. With respect to the adjustment of the full-open opening degree on the basis of the full-open stopper positions 11 and 12, an opening degree/flow rate characteristic of the throttle body is experimentally experimentally measured in advance by a prototype and the full-opening opening degree corresponding to the maximum required air flow rate of each internal combustion engine is determined in advance. At the mass production stage, the adjusting screw 10 is inserted and the opening degree is matched with the preset full-open opening degree while the value of a rotational angle detecting sensor 15 for detecting the opening degree of the throttle valve 8 is checked.

Furthermore, FIG. 4 shows the adjustment state of the full-close adjusting screw 20 at the full-close position, and the adjusting state has a full-close stopper position 21 and the full-close stopper position 22 of the lever 2 corresponding to the full-close stopper position 21. The full-close adjusting screw 20 abuts against an end face of the lever 2 at the opposite side to the full-open contact surface of the lever 2, whereby the opening degree of the air-intake throttle valve under the full-close state can be changed.

With the respect to the full-close opening degree of the throttle valve 8, the full-close stopper position 21 of the adjusting screw 20 can be adjusted in a predetermined range (not shown) by threadably inserting the full-close adjusting screw 20.

Figure 5:
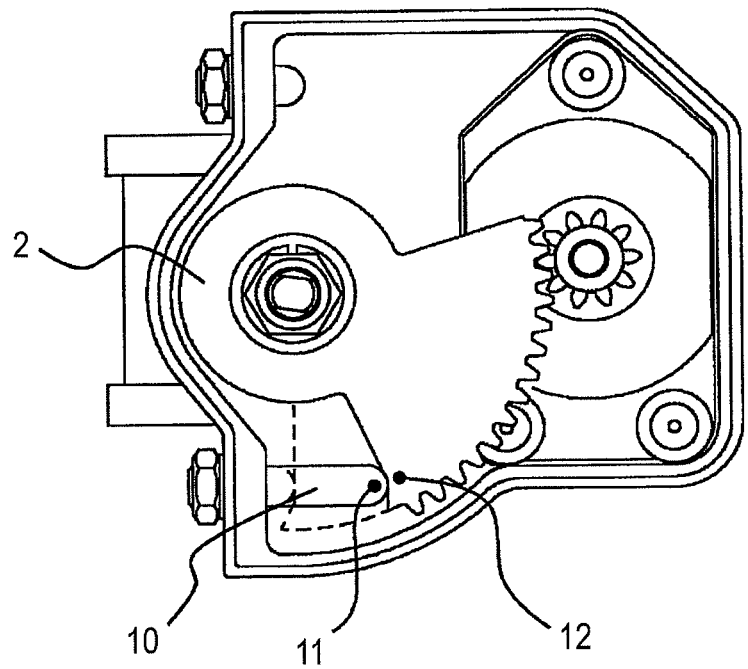
FIG. 5 is a plan view of a decelerating unit according to a second embodiment of the present invention.
Figure 6:
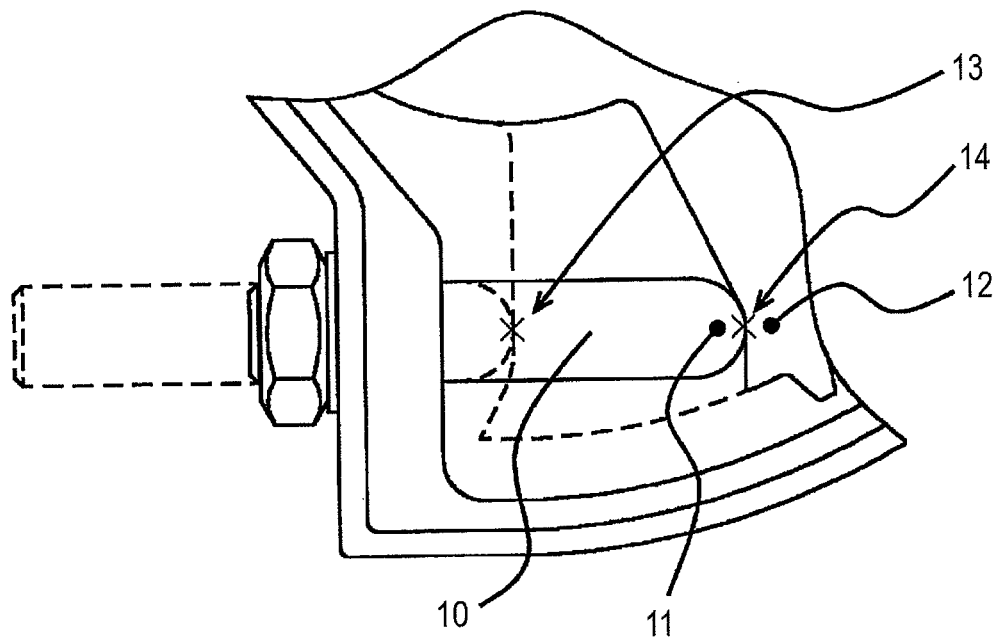
FIG. 6 is an enlarged view showing a full-open stopper unit according to the second embodiment of the present invention.

The tip of each of the adjusting screws 10 and 20 of the first embodiment is designed to have a spherical shape because the corner contact between each of the screws 10, 20 and the lever 2 is prevented, thereby suppressing abrasion of the contact portion when the adjusting screws 10, 20 are fastened. Second Embodiment FIG. 5 is a plan view of a decelerating mechanism to show an air-intake control valve according to a second embodiment of the present invention. FIG. 6 is an enlarged view of the stopper unit.

In FIG. 5, the same parts as or the corresponding parts to the first embodiment are represented by the same reference numerals. In the throttle body of the first embodiment, when the opening degree is changed in the broad range by the adjusting screws 10 and 20, the contact surface of the lever 2 is located at a farther position from the center of the spherical surface of the tip of the adjusting screw 10, 20 as the adjusting screw 10 is fastened more firmly. Therefore, when the contact abrasion is repeated, it is difficult to keep the contact surface stable.

Therefore, according to the second embodiment, the contact surface of the lever 2 is designed to have a curved surface at the stopper unit for regulating the opening degree of the air-intake throttle valve 1 so that the contact surface of the lever 2 abuts against substantially the center of the spherical surface of the tip of the adjusting screw even when the adjusting screw 10 is located at any position in the adjusting range. For example, when the tip shape of the full-open stopper position 11 of the lever 2 is designed to have a curved surface as shown in FIG. 5, the stopper contact portion is located substantially at the center of the tip of the adjusting screw 10 both under the state that the adjusting screw 10 is most loosened (indicated by a broken line) and under the state that the adjusting screw 10 is fastened most firmly (indicated by a solid line).

Even when the contact surface is worn due to the repetitive contact, the load can be stably received by the tip portion of the adjusting screw, and the durability can be more enhanced as compared with the first embodiment.

Various modifications and alterations of this invention will be apparent to those skilled in the art without departing from the scope and spirit of this invention, and it should be understood that this is not limited to the illustrative embodiments set forth herein.

What is claimed is:

1. A method for internal combustion engines that have maximum air flow rates different from one another, and each includes a throttle body comprising an air-intake throttle valve comprising a body portion having an air-intake passage formed therein, the method comprising:

determining, in advance, pre-specified amounts of an opening degree of throttle valves in a full-open state to correspond to the maximum air flow rates of respective internal combustion engines, so that each of the throttle valves assumes a variable position with respect to an air flow direction of the air-intake passage based on the pre-specified amounts of the opening degree that are determined in advance to correspond to the maximum air flow rates of each of the internal combustion engines;

inserting an adjusting screw from an outside of the body portion of a corresponding throttle valve to abut against a lever portion in the body portion;

adjusting, with the screw, the opening degree of the corresponding throttle valve in the full-open state to the pre-specified amount of the opening degree, determined in advance for the respective internal combustion engine which is to accommodate a corresponding throttle body comprising the corresponding throttle valve; and interlocking the lever portion with a decelerating mechanism which rotates a valve shaft attached to the corresponding throttle valve by a motor and varies an opening area of the air-intake passage.

2. The method according to claim 1, further comprising:
subsequent to the adjusting, installing the corresponding throttle body in the respective internal combustion engine.

3. The method according to claim 1, further comprising:
inserting adjusting screws to abut against the lever portion at different positions corresponding to the determined pre-specified amounts of the opening degree in each of corresponding throttle bodies; and installing each of the corresponding throttle bodies in each respective one of the internal combustion engines which have maximum air flow rates different from one another.

4. The method according to claim 1, wherein the inserting comprises:

inserting a first adjusting screw into a first position, for a first throttle valve of a first internal combustion engine to assume a non-parallel position, with respect to the air flow direction of the air-intake passage, in the full-open state, or inserting a second adjusting screw into a second position, for a second throttle valve of a second internal combustion engine to assume a substantially parallel position, with respect to the air flow direction of the air-intake passage, in the full-open state, wherein the non-parallel position corresponds to a first pre-specified amount of the opening degree in the full-open state determined to correspond to a first maximum air flow rate of the first internal combustion engine, the substantially parallel position corresponds to a second pre-specified amount of the opening degree in the full-open state that is greater than the first pre-specified amount, and the substantially parallel position corresponds to a second maximum air flow rate of the second internal combustion engine whose maximum air flow rate is greater than that of the first internal combustion engine.

\* \* \* \* \*